US010378926B2

(12) United States Patent
Tiemann et al.

(10) Patent No.: US 10,378,926 B2
(45) Date of Patent: Aug. 13, 2019

(54) SCALE AND POSITION-MEASURING DEVICE

(71) Applicant: DR. JOHANNES HEIDENHAIN GmbH, Traunreut (DE)

(72) Inventors: Marc Oliver Tiemann, Waging am See (DE); Tarek Nutzinger, Vachendorf (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 126 days.

(21) Appl. No.: 15/603,472

(22) Filed: May 24, 2017

(65) Prior Publication Data

US 2017/0350728 A1    Dec. 7, 2017

(30) Foreign Application Priority Data

Jun. 7, 2016 (EP) .................................. 16173324

(51) Int. Cl.
*G01B 7/14* (2006.01)
*G01D 5/20* (2006.01)
*G01D 5/22* (2006.01)

(52) U.S. Cl.
CPC ............... *G01D 5/204* (2013.01); *G01B 7/14* (2013.01); *G01D 5/2046* (2013.01); *G01D 5/2053* (2013.01); *G01D 5/2275* (2013.01)

(58) Field of Classification Search
CPC .... G01D 5/204; G01D 5/2046; G01D 5/2275; G01D 5/2457; G01D 5/142; G01D 5/16; G01D 5/26; G01B 7/14

(Continued)

(56) References Cited

U.S. PATENT DOCUMENTS 5,553,390 A * 9/1996 Ernst ..................... B61L 25/025
33/706
5,648,658 A * 7/1997 Holzapfel ................ G01D 5/38
250/231.14

(Continued)

FOREIGN PATENT DOCUMENTS

EP    0356370 A1    2/1990
EP    0743508 A2    11/1996

(Continued)

*Primary Examiner* — Yaritza Guadalupe-McCall
(74) *Attorney, Agent, or Firm* — Leydig, Voit & Mayer, Ltd.

(57) ABSTRACT

A scale for inductive position measurement along a measurement direction X includes a support channel made of electrically conductive material having two interconnected spaced-apart side walls extending parallel to the measurement direction X and enclosing an interstitial space therebetween. A succession of first graduations made of electrically conductive material are disposed on the support channel, located in the interstitial space opposite and spaced from one of the two side walls and extending parallel to the measurement direction X. A succession of second graduations made of electrically conductive material are disposed on the support channel, located in the interstitial space opposite and spaced from the other one of the two side walls and extending parallel to the measurement direction X. The succession of first graduations and the succession of second graduations form a gap configured to receive a scanner operable to inductively scan the first graduations and the second graduations.

17 Claims, 5 Drawing Sheets

(58) Field of Classification Search
USPC .......................................................... 33/708
See application file for complete search history.

(56) References Cited

U.S. PATENT DOCUMENTS

| | | | | |
|---|---|---|---|---|
| 6,002,126 A * | 12/1999 | Feichtinger | ........ | G01D 5/34707 250/231.13 |
| 6,011,389 A | 1/2000 | Masreliez et al. | | |
| 6,124,708 A | 9/2000 | Dames | | |
| 6,178,656 B1 * | 1/2001 | Jung | ........ | G01B 3/02 33/702 |
| 6,541,761 B1 * | 4/2003 | Holzapfel | ........ | G01D 5/38 250/231.14 |
| 8,234,792 B2 | 8/2012 | Schenk et al. | | |
| 9,395,214 B2 * | 7/2016 | Himmel | ........ | G01D 5/266 |
| 9,958,296 B2 * | 5/2018 | Heumann | ........ | G01D 5/2013 |
| 10,060,731 B2 * | 8/2018 | Lepperdinger | ........ | G01B 11/14 |
| 10,060,765 B2 * | 8/2018 | Holzapfel | ........ | G01B 11/14 |
| 2004/0211072 A1 * | 10/2004 | Hertenberger | ........ | G01D 11/30 33/1 PT |
| 2004/0232320 A1 * | 11/2004 | Holzapfel | ........ | G01D 5/366 250/231.13 |
| 2004/0246500 A1 * | 12/2004 | Holzapfel | ........ | G01D 5/34715 356/616 |
| 2013/0062513 A1 * | 3/2013 | Gruber | ........ | G01D 5/34715 250/231.1 |
| 2017/0160102 A1 * | 6/2017 | Heumann | ........ | G01D 5/2013 |
| 2017/0350728 A1 * | 12/2017 | Tiemann | ........ | G01B 7/14 |
| 2018/0172433 A1 * | 6/2018 | Lepperdinger | ........ | G01B 11/14 |

FOREIGN PATENT DOCUMENTS

| | | |
|---|---|---|
| EP | 2306157 A2 | 4/2011 |
| WO | WO 9719323 A1 | 5/1997 |

* cited by examiner

SCALE AND POSITION-MEASURING DEVICE

CROSS-REFERENCE TO PRIOR APPLICATION

Priority is claimed to European Patent Application No. EP 16173324.1, filed on Jun. 7, 2016, the entire disclosure of which is hereby incorporated by reference herein.

FIELD

The present invention relates to a scale for inductive position measurement, as well as to a position-measuring device having such a scale.

BACKGROUND

Position-measuring devices which operate according to the inductive measuring principle have a scale having an inductively scannable graduation. The graduation includes a sequence of electrically conductive graduation elements spaced apart from one another. In the measurement mode, the graduation is scanned by a scanning unit, which has at least one excitation winding and one scanning winding. An excitation current impressed on the excitation winding generates a time-changing electromagnetic excitation field, which is influenced as a function of position by the array of graduation elements, and, as a result, a position-dependent scanning signal is induced in the associated scanning winding.

SUMMARY

In an embodiment, the present invention provides a scale for inductive position measurement along a measurement direction X. The scale includes a support channel made of electrically conductive material having two interconnected spaced-apart side walls extending parallel to the measurement direction X and enclosing an interstitial space therebetween. A succession of first graduations made of electrically conductive material are disposed on the support channel, located in the interstitial space opposite and spaced from one of the two side walls and extending parallel to the measurement direction X. A succession of second graduations made of electrically conductive material are disposed on the support channel, located in the interstitial space opposite and spaced from the other one of the two side walls and extending parallel to the measurement direction X. The succession of first graduations and the succession of second graduations form a gap configured to receive a scanner operable to inductively scan the first graduations together with the second graduations.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
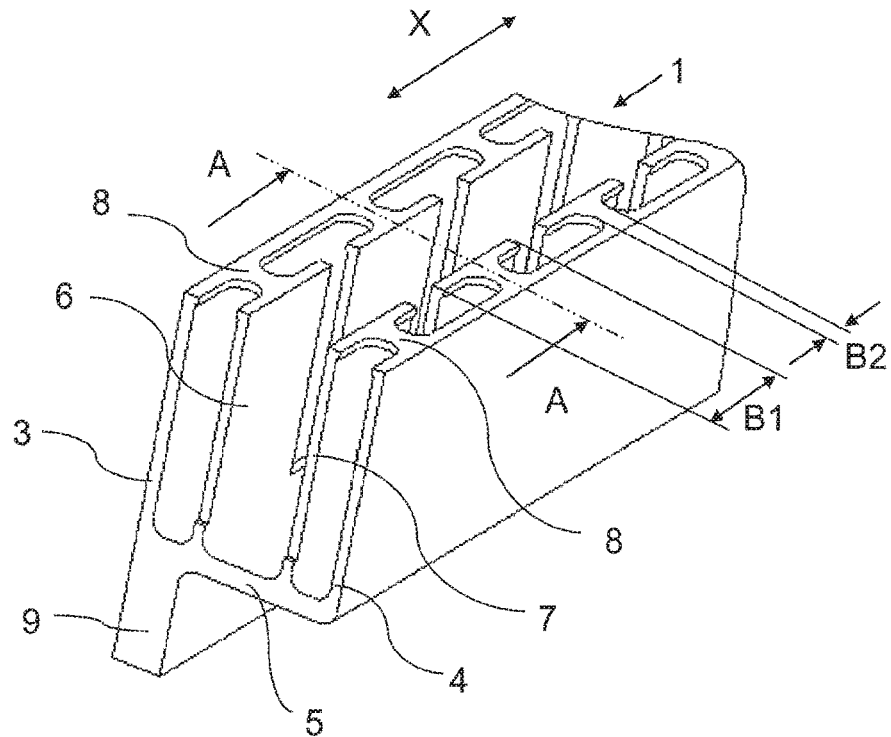
FIG. 1 is a perspective view of an inductively scannable scale configured in accordance with an embodiment of the present invention.
Figure 2:
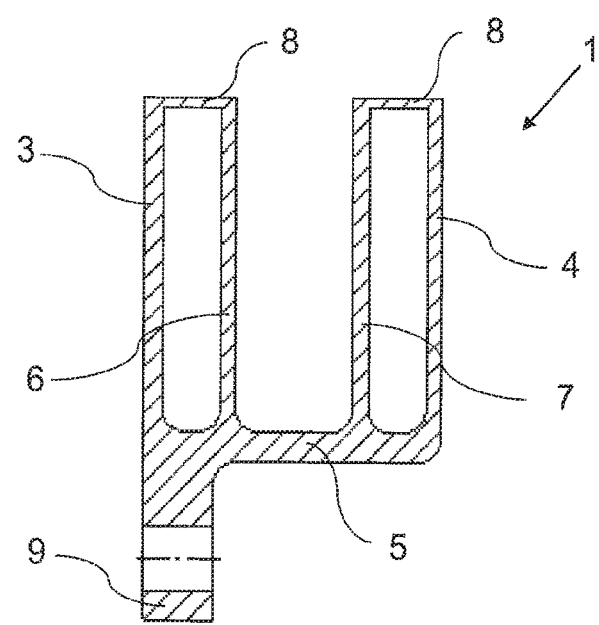
FIG. 2 is a cross-sectional view of the scale, taken along line A-A in FIG. 1.

In an embodiment, the present invention provides an inductively scannable scale that is simple to manufacture and particularly stable and insensitive to environmental influences.

According to an embodiment, the scale for inductive position measurement along a measurement direction includes:

a support channel member made of electrically conductive material and having two interconnected spaced-apart side walls extending parallel to the measurement direction and enclosing a space therebetween;

a succession of first graduation elements made of electrically conductive material, the succession of first graduation elements being disposed on the support channel member, located in the interstitial space opposite and spaced from one of the two side walls and extending parallel to the measurement direction;

a succession of second graduation elements made of electrically conductive material, the succession of second graduation elements being disposed on the support channel member, located in the interstitial space opposite and spaced from the other of the two side walls and extending parallel to the measurement direction, the succession of first graduation elements and the succession of second graduation elements forming a gap for a scanning unit for inductively scanning the first graduation elements together with the second graduation elements.

To this end, the succession of first graduation elements and the succession of second graduation elements are spaced apart in a direction perpendicular to the measurement direction.

The first graduation elements and the second graduation elements are each tongue-shaped elements which are spaced apart from one another in the measurement direction and provide surfaces opposite the scanning unit for the formation of eddy currents.

A particularly stable construction is obtained if each of the first and second graduation elements is connected to the respective opposite side wall at its base and at its end portion that is spaced apart from its base in a direction perpendicular to the measurement direction.

The first graduation elements may alternatively be connected at their bases to the bases of the second graduation elements and, in addition, the first and second graduation elements may each be connected to the respective opposite side wall at their end portions that are spaced apart from their bases in a direction perpendicular to the measurement direction. Here too, each of the first and second graduation elements may optionally be additionally connected to the respective opposite side wall at its base.

In order to prevent the graduation elements from being short-circuited via one of the two side walls, it is advantageous if the connection of the first and second graduation elements to the respective opposite side walls is provided at at least one position with a constriction whose width is a fraction of the width of the graduation element to be connected thereby. It is sufficient if only one of the two positions "base" and "end portion" is provided with a constriction.

The connections of the graduation elements at their end portions to the respective side wall opposite and spaced therefrom are each preferably configured as a bridge whose width in the measurement direction is a fraction of the width of the graduation element to be connected.

The above-described connections of the graduation elements to each other and to the side walls are made of electrically conductive material and preferably integrally formed to the side walls and/or to the graduation elements by deformation processing.

The scale can be manufactured in an advantageous manner if it is a self-supporting channel member of electrically conductive material formed by deformation processing.

It is particularly advantageous if the scale composed of the support channel member, including the two side walls and the connection of these two side walls, as well as the succession of first graduation elements, the succession of second graduation elements, as well as the connections of the graduation elements to the side walls, are together constituted by a channel member produced of electrically conductive material formed by deformation processing, the channel member preferably being an extruded channel member. Materials suitable for this purpose are, in particular, aluminum, copper or also electrically conductive plastic.

Alternatively, the scale may also be manufactured from sheet metal by deformation processing.

In particular, the succession of first graduation elements and the succession of second graduation elements are configured for absolute position measurement over a path including a plurality of first graduation elements.

Preferably, the absolute position measurement is performed using the vernier principle. The vernier principle means that there is a non-integer ratio between the number of periodic repetitions of the first graduation elements and the number of periodic repetitions of the second graduation elements. In particular, the succession of first graduation elements is a periodic incremental graduation having a first graduation period, and the succession of second graduation elements is a periodic incremental graduation having a second graduation period that differs slightly from the first graduation period.

In another embodiment, the present invention provides an inductive position-measuring device that is simple to manufacture and particularly insensitive to environmental influences.

This position-measuring device equipped with the scale according to an embodiment of the present invention has a scanning unit which is disposed in the gap and displaceable relative to the scale and which has a first sensor for scanning the first graduation elements and a second sensor for scanning the second graduation elements. The first sensor has an excitation winding for generating an alternating electromagnetic field and a scanning winding for detecting the alternating electromagnetic field modulated as a function of position in the first graduation elements, and the second sensor has an excitation winding for generating an alternating electromagnetic field and a scanning winding for detecting the alternating electromagnetic field modulated as a function of position in the second graduation elements.

The excitation windings and the scanning windings are preferably formed as planar windings.

A first exemplary embodiment of the present invention will be described in detail with reference to FIGS. 1 through 4. FIG. 1 shows a scale 1 having two measuring graduations extending in measurement direction X, the two measuring graduations being disposed opposite each other and forming a gap therebetween. The first measuring graduation is formed by first graduation elements 6 having a first graduation period P1, and the second measuring graduation is formed by second graduation elements 7 having a second graduation period P2. The periodically arranged graduation elements 6 and 7 of the two measuring graduations are scannable inductively and, therefore, the periodic sequences of graduation elements 6, 7 spaced apart from one another in measurement direction X are made of electrically conductive material. In the exemplary embodiment shown, these graduation elements 6,7 are flat tongues of rectangular outer contour. Graduation elements 6, 7 constitute inductive coupling elements which modulate the strength of the inductive coupling between an excitation winding 111, 121 and a scanning winding 112, 113; 122, 123 as a function of position by means of eddy currents forming in each of graduation elements 6, 7 and counteracting the excitation field. Therefore, graduation elements 6, 7 are often also referred to as coupling elements or damping elements.

Scale 1 is self-supporting and composed of a support channel member made of electrically conductive material, the support channel member being formed by two spaced-apart side walls 3 and 4 extending parallel to measurement direction X and enclosing a space therebetween, and a connection holding the two side walls together. In the example, the connection takes the form of a connecting web 5. In the interstitial space enclosed by side walls 3, 4, the succession of first graduation elements 6 is located opposite and spaced from side wall 3 and extends parallel to measurement direction. Furthermore, in the interstitial space enclosed by side walls 3, 4, the succession of second graduation elements 7 is located opposite and spaced from side wall 4 and extends parallel to measurement direction X.

The succession of first graduation elements 6 constitutes the first measuring graduation, and the succession of second graduation elements 7 constitutes the second measuring graduation. The succession of first graduation elements 6 and the succession of second graduation elements 7 are, in turn, spaced apart in a direction perpendicular to measurement direction X, thus forming a gap for a scanning unit 10 for inductively scanning first graduation elements 6 together with second graduation elements 7.

First graduation elements 6 and second graduation elements 7 take the form of tongues disposed on the support channel member and spaced apart from one another in measurement direction X. Each of graduation elements 6, 7 is disposed with its base on the connecting web 5 connecting side walls 3, 4 and connected with its end portion to the respective opposite side wall 3, 4 via a connection of electrically conductive material. In the example, this connection is configured as a bridge 8, each of first graduation elements 6 and second graduation elements 7 being connected via a separate bridge 8. The individual bridges 8 are spaced apart from one another in measurement direction X.

Connecting web 5 and bridges 8 are connections which extend transversely, in particular perpendicularly, to the surfaces of graduation elements 6, 7 in which the eddy currents for position measurement are induced. In other words, connecting web 5 and bridges 8 have surfaces which extend at an angle, preferably perpendicularly, to the surfaces of graduation elements 6, 7.

The connection between the respective graduation element 6, 7 and side wall 3, 4 has a constriction at at least one position in order to offer particularly high resistance to propagation of eddy currents from graduation elements 6, 7 to side walls 3, 4. This constriction in the connection to the respective side wall 3, 4 is provided at at least one of the two positions "base" and "end portion" and has a width B2 which is a fraction of the width B1 of the graduation element 6, 7 to be connected to the support channel member. In the exemplary embodiment, the constriction is formed at bridges 8, and the width B2 of bridges 8, considered in measurement direction X, is in each case a fraction of the width B1 of the graduation element 6, 7 to be connected. Preferably, bridges 8 are each disposed in the middle of a graduation element 6, 7. The constriction so formed at at least one of the two positions "base" and "end portion" prevents the eddy currents from being short-circuited via the respective side wall 3, 4, while at the same time ensuring stable and vibration-free positioning of graduation elements 6, 7.

In this first exemplary embodiment, scale 1 is a channel member fabricated from electrically conductive material by forming under compressive conditions. The pressure forming method is preferably an extrusion method, so that the scale is an extruded channel member. Suitable materials include any extrudable, electrically conductive material, in particular aluminum and aluminum alloys. By means of the extrusion process, the cavity enclosed by outer side wall 3, bridges 8, the succession of first graduation elements 6 and connecting web 5, and the cavity enclosed by outer side wall 4, bridges 8, the succession of second graduation elements 7 and connecting web 5 can be manufactured particularly easily. Graduation elements 6, 7 are each integrally formed to the connecting web 5 connecting the two side walls 3, 4 at their base, the lower position in FIGS. 1, 2 and 3, and at their end portion, the upper position in FIGS. 1, 2 and 3, they are each integrally formed to the respective side walls 3, 4 via a connection configured as a bridge 8 and extending perpendicularly to measurement direction X. If scale 1 is an extruded channel member, then side walls 3, 4, connecting web 5, the succession of first graduation elements 6, the succession of second graduation elements 7, as well as bridge 8 are formed together from an electrically conductive material by extrusion.

The interstices between each two successive first graduations elements 6 in measurement direction X and the interstices between each two successive second graduations elements 7 in measurement direction X are formed in the extruded channel member by a material removal machining process, in particular by milling. The interstices between successive bridges 8 are also formed by a material removal machining process, in particular by milling.

Advantageously, scale 1 includes a mounting element 9 via which the scale can be mounted to an object 20 to be measured, in particular by screws. Mounting element 9 is preferably integrally formed to the scale 1, for example, as a strip-shaped extension of one of the side walls 3, 4, the strip-shaped extension extending continuously or discontinuously in measurement direction X.

Graduation period P1 of graduation elements 6 of the first measuring graduation and graduation period P2 of graduation elements 7 of the second measuring graduation differ only slightly, so that an absolute position AP can be derived therefrom over several such graduation periods P1, P2. Thus, the absolute position measurement is based on the vernier principle.

The inductive position-measuring device having the inventive scale 1 includes a scanning unit 10 for scanning the two measuring graduations. To this end, the scanning unit is disposed between the first measuring graduation and the second measuring graduation. For purposes of position measurement, scanning unit 10 is displaceable relative to scale 1 in measurement direction X. As shown schematically in FIG. 3, scanning unit 10 includes a first sensor 11 for scanning the succession of first graduation elements 6 and generating at least one first position-dependent scanning signal S1, S11. Scanning unit 10 further includes a second sensor 12 for scanning the succession of second graduation elements 7 and generating at least one second position-dependent scanning signal S2, S21.

Figure 4:
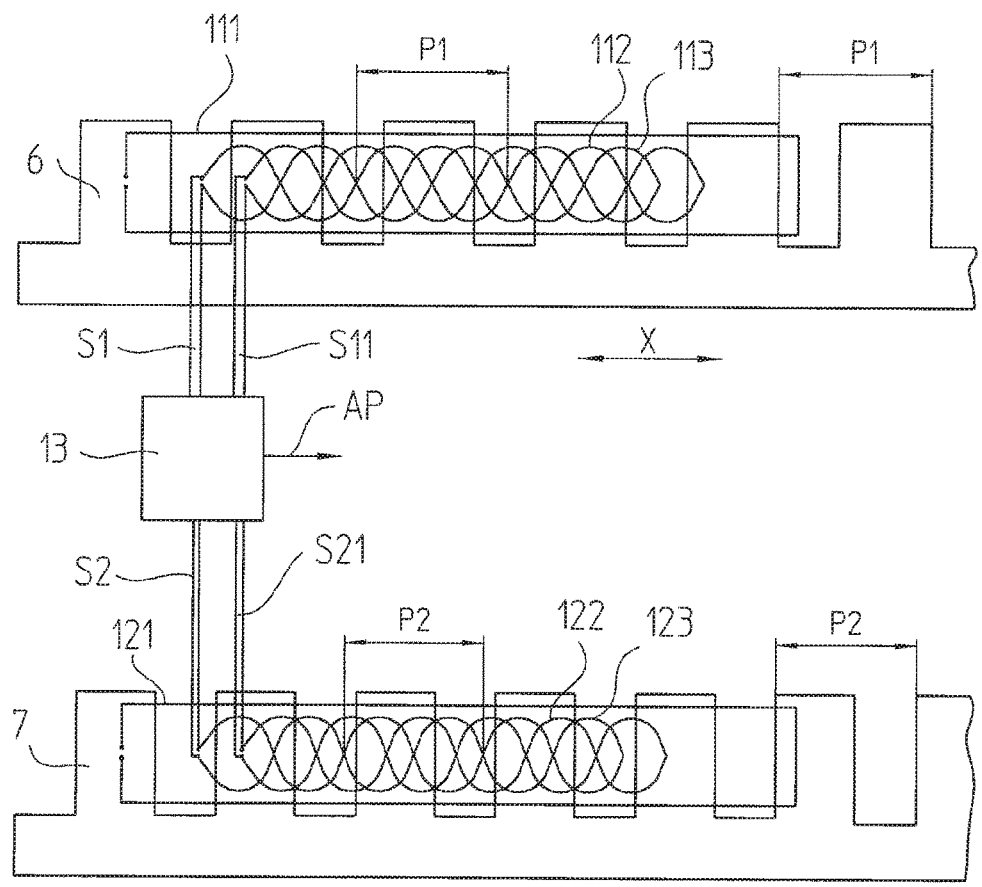
FIG. 4 is a view illustrating the basic design of the scanning unit.

The design of sensors 11 and 12 is explained in more detail with reference to FIG. 4. First sensor 11 has a first excitation winding 111 and a plurality of first mutually phase-shifted periodic scanning windings 112, 113. Similarly, second sensor 12 has a second excitation winding 121 and a plurality of second mutually phase-shifted periodic scanning windings 122, 123. First scanning windings 112, 113 each include a plurality of periodic sinusoidal windings arranged along measurement direction X for simultaneous scanning of a plurality of graduation elements 6 of the first measuring graduation, which are arranged along measurement direction X, and for generating a plurality of mutually phase-shifted first sinusoidal scanning signals S1, S11 having the signal period P1. Second scanning windings 122, 123 each include a plurality of periodic sinusoidal windings arranged along measurement direction X for simultaneous scanning of a plurality of graduation elements 7 of the second measuring graduation, which are arranged along measurement direction X, and for generating a plurality of mutually phase-shifted second sinusoidal scanning signals S2, S21 having the signal period P2.

Planar excitation winding 111 of first sensor 11 is energized with an excitation current such that a time-changing electromagnetic excitation field is generated in the region of graduation elements 6 of the first measuring graduation. This excitation current has a frequency of 100 kHz to 10 MHz.

Scanning windings 112, 113 of first sensor 11 are disposed within excitation winding 111. The excitation field generated by excitation winding 111 generates eddy currents in graduation elements 6, the eddy currents counteracting the excitation field as an opposing field. The excitation field associated with scanning windings 112, 113 induces a voltage therein which is dependent on the relative position with respect to the electrically conductive graduation elements 6. Thus, excitation winding 111 is inductively coupled to scanning windings 112, 113 as a function of the relative position of graduation elements 6 with respect thereto in measurement direction X. The alternating electromagnetic field is modulated by graduation elements 6 as a function of position in measurement direction X. As a result, the voltage induced in scanning windings 112, 113 also varies as a function of position. The voltage induced in the respective scanning windings 112, 113 is supplied in the form of scanning signals S1, S11 to an evaluation unit 13.

Planar excitation winding 121 of second sensor 12 is also energized with an excitation current such that a time-changing electromagnetic excitation field is generated in the region of graduation elements 7. This excitation current has a frequency of 100 kHz to 10 MHz.

Scanning windings 122, 123 of second sensor 12 are disposed within excitation winding 121. The excitation field generated by excitation winding 121 generates eddy currents in graduation elements 7, the eddy currents counteracting the excitation field as an opposing field. The excitation field associated with scanning windings 122, 123 induces a voltage therein which is dependent on the relative position with respect to the electrically conductive graduation elements 7. Thus, excitation winding 121 is inductively coupled to scanning windings 122, 123 as a function of the relative position of graduation elements 7 with respect thereto in measurement direction X. The alternating electromagnetic field is modulated by graduation elements 7 as a function of position in measurement direction X. As a result, the voltage induced in scanning windings 122, 123 also varies as a function of position. The voltage induced in the respective scanning windings 122, 123 is supplied in the form of scanning signals S2, S21 to evaluation unit 13.

Scanning signals S1, S11, S2, S21 are applied to evaluation unit 13 of scanning unit 10, which is configured to generate therefrom in a known manner the unique absolute position AP of scanning unit 10 relative to scale 1 over a measurement range including a plurality of first graduation elements 6.

Evaluation unit 13 may be configured to generate a beat signal indicative of the unique absolute position AP by comparing the phase angles of scanning signals S1, S11 with scanning signals S2, S21. Alternatively, evaluation unit 13 may be configured to generate a first position from scanning signals S1, S11 through interpolation and to generate a second position from scanning signals S2, S21 through interpolation, and to calculate the unique absolute position AP from the two positions.

The measurement range to be absolutely coded is dependent in a known manner on the selected difference between the two graduation periods P1, P2. It is particularly advantageous if the number of graduation periods P1 and the number of graduation periods P2 over the entire measurement range to be absolutely coded differ by one. Absolute position AP is preferably provided as a digital data word, preferably in serial form, at the output of scanning unit 10.

Figure 3:
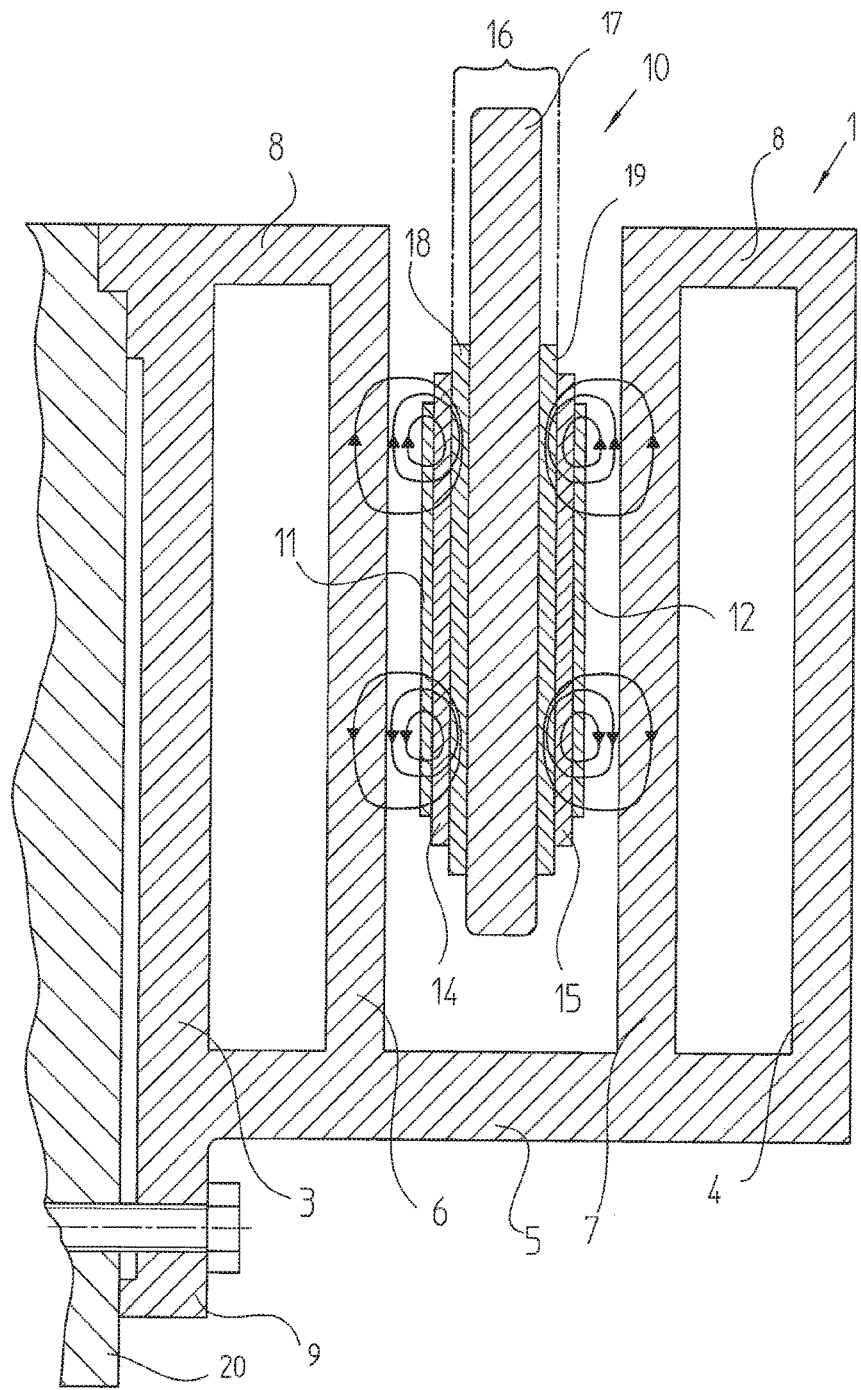
FIG. 3 is a cross-sectional view showing the scale of FIGS. 1 and 2 with a scanning unit.

The construction of scanning unit 10 will be described in more detail with reference to the cross-sectional view of FIG. 3. First sensor 11, including excitation winding 111 and scanning windings 112, 113, is disposed on a first circuit board 14 at a small scanning distance from first graduation elements 6. Second sensor 12, including excitation winding 121 and scanning windings 122, 123, is disposed on a second circuit board 15 at a small scanning distance from second graduation elements 7. An intermediate layer 16 including a soft magnetic material is disposed between first sensor 11 and second sensor 12.

The intermediate layer 16 including the soft magnetic material has the function of guiding the field lines of the alternating magnetic field that originate from first sensor 11 within intermediate layer 16 and thereby forming a closed and spatially confined magnetic circuit, as well as the function of guiding the field lines of the alternating magnetic field that originate from second sensor 12 within intermediate layer 16 and thereby forming a closed and spatially confined magnetic circuit. Thus, intermediate layer 16 separates the field lines originating from first sensor 11 from the field lines originating from second sensor 12.

In the exemplary embodiment, intermediate layer 16 is composed of a soft magnetic core 17 that is provided on both sides with a layer 18, 19 which is electrically non-conductive or has very poor electrical conductivity and which includes a soft magnetic material. No eddy currents can form in layers 18, 19, which would attenuate the excitation field of the respective sensors 11, 12. Due to the relatively high permeability (much greater than one) of layers 18, 19, the excitation field is guided in layers 18, 19 and thereby increased. This prevents an excessive amount of magnetic flux reaching core 17, so that no eddy currents can form there, which could attenuate the excitation field. Layers 18, 19 preferably have a thickness of 100 µm to 1000 µm each.

Advantageously, core 17 is composed of a soft magnetic, electrically conductive metal. A particularly suitable material for core 17 is soft magnetic steel. Core 17 has a thickness of few mm.

The permeability of core 17 is preferably greater than that of the two layers 18, 19. In this manner, it is achieved that the flux density in core 17 is greater than in layers 18, 19. Therefore, external magnetic fields (interference fields) propagate, for the most part, in core 17, and layers 18, 19 do not go into saturation so easily.

A particularly suitable matrix material for layers 18, 19 is electrically non-conductive matrix material having soft magnetic particles embedded therein. Therefore, layers 18, 19 may be formed of a film of flux field directional material. One suitable matrix material is plastic, particularly epoxy resin, having the soft magnetic particles in powder form mixed therein.

Centrally disposed core 17, layers 18, 19 disposed on both sides thereof, circuit boards 14, 15 attached thereto, as well as planar excitation windings 111, 121 and scanning windings 112, 113, 122, 123 disposed thereon form a sandwich-like stack, providing a compact construction which, in addition, is mechanically stable because of the metallic core 17.

In an alternative construction, the soft magnetic intermediate layer may be composed of a mu-metal. In this exemplary embodiment, layers 18, 19 are not absolutely necessary, so that circuit boards 14, 15, including planar excitation windings 111, 121 and scanning windings 112, 113, 122, 123 disposed thereon, may be attached directly to the mu-metal. The intermediate layer in the form of a mu-metal is electrically conductive, but because of the extremely high permeability of mu-metal in alternating fields in the range of 2 MHz, the penetration depth of the alternating fields is very small, and the alternating fields extend only to depths of a few µm, so that the effective electrical resistance is very high and, therefore, no or only negligible eddy currents are formed, which could counteract and attenuate the excitation field of the respective excitation winding 111, 121.

First sensor 11 and second sensor 12 of scanning unit 10 may be protected by a coating of electrically insulating material. The coating may be a film or may be applied to scanning unit 10 by insert molding.

Figure 5:
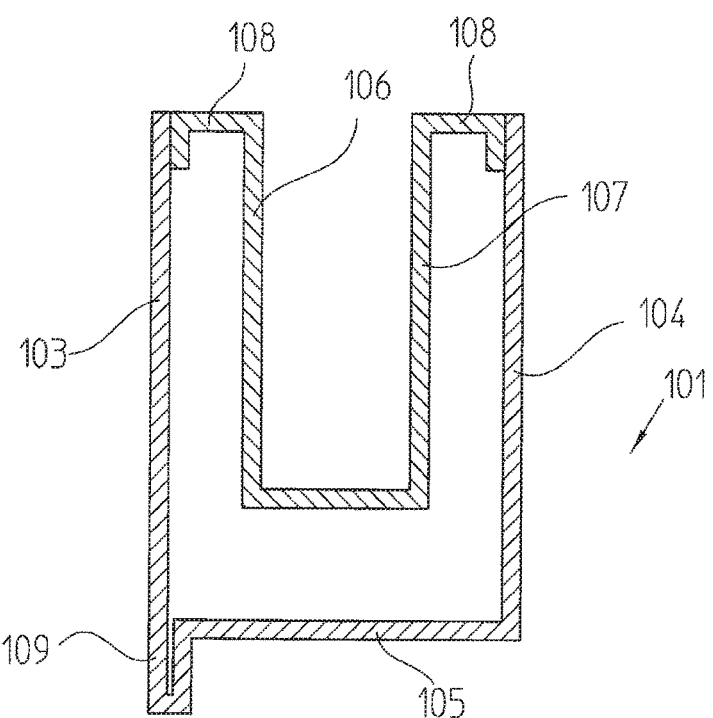
FIG. 5 is a cross-sectional view of a second example of a scale configured in accordance with an embodiment of the present invention.
Figure 6:
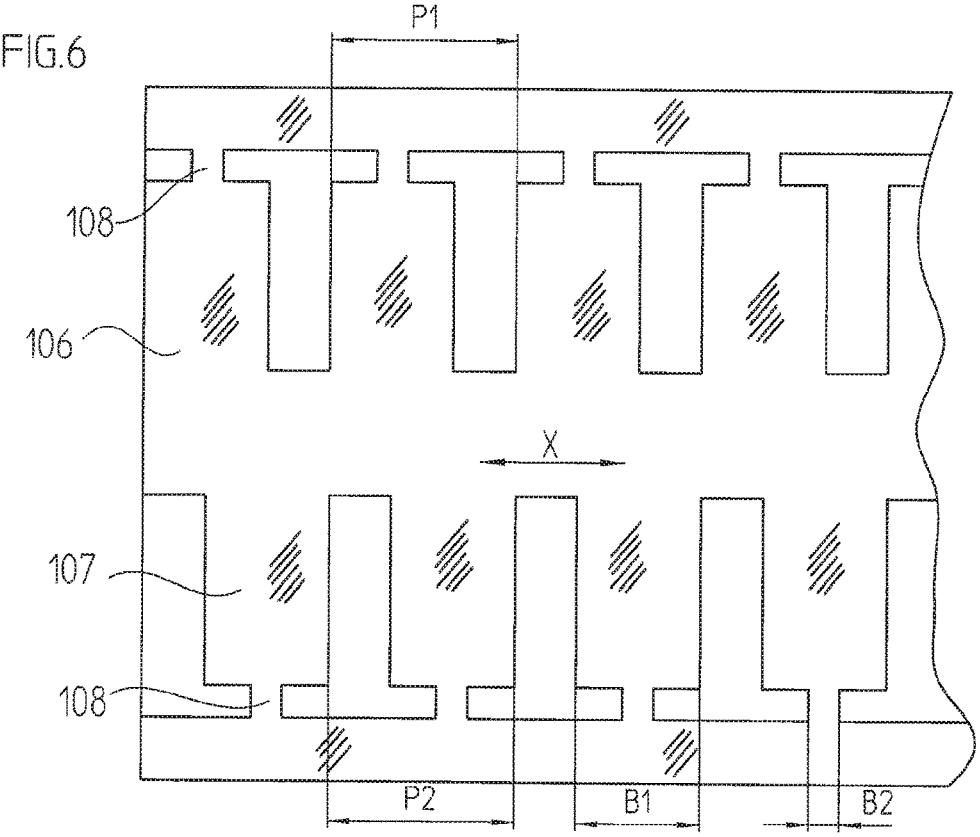
FIG. 6 is a view of the graduation elements of the scale shown in FIG. 5.

A second exemplary embodiment of a scale 101 configured in accordance with the present invention is described with reference to FIGS. 5 and 6. Again, scale 101 is self-supporting, composed of electrically conductive material and includes a support channel member formed by two outer side walls 103, 104, and a connecting web 105 connecting these side walls 103, 104. The support channel member is preferably provided with a mounting element 109 via which scale 101 can be mounted to an object to be measured.

Again, the succession of first graduation elements 106 and the succession of second graduation elements 107 are disposed in the interstitial space enclosed by side walls 3, 4. First graduation elements 106 spaced apart from one another in measurement direction X and second graduation elements 107 spaced apart from one another in measurement direction X are each connected at their end portions to the respective side wall 103, 104 via respective bridge 108. Connecting web 105 connects first graduation elements 106 to second graduation elements 107 at their respective bases. In this example, scale 101 is composed of two parts, namely a first part including bridges 108 and graduation elements 106, 107, and a second part including side walls 103, 104 and connecting web 5 and, optionally, mounting element 109. Each of the two parts forms a channel member, which may be an extruded channel member or a bent part. In the example, both parts are fabricated by deforming a respective sheet of metal, and both parts are fixedly connected to each other in the region of bridge 108, for example, by welding. In FIG. 6, the sheet-metal part in which graduation elements 106, 107 and bridges 108 are formed is shown prior to deformation processing. The interstices between successive graduations elements 106, 107 in measurement direction X and between bridges 108 may be formed by a material removal machining process, laser cutting, water jet cutting or by punching.

Figure 7:
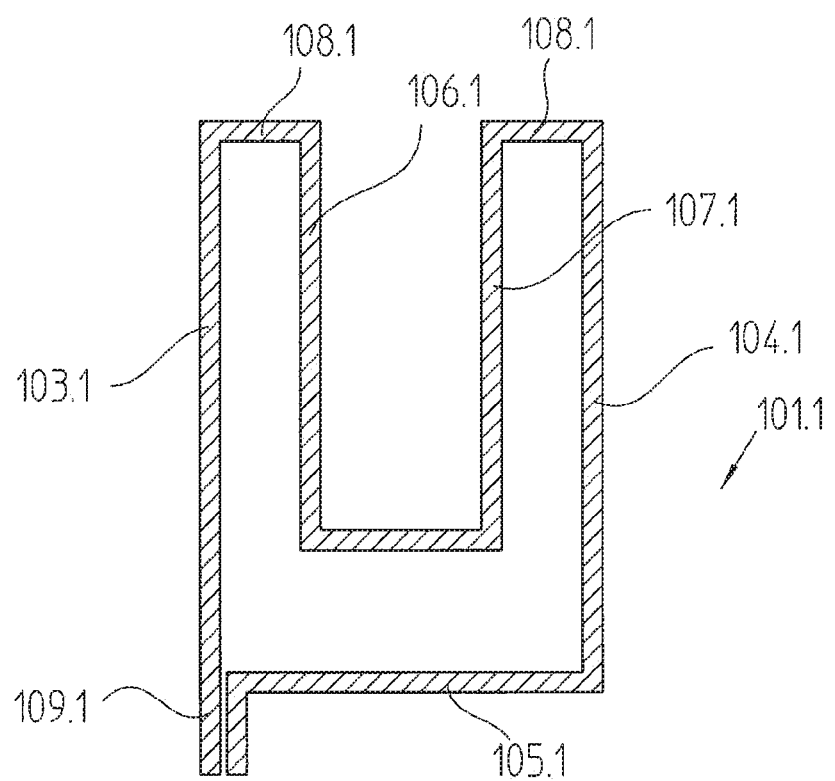
FIG. 7 is a cross-sectional view of a third example of a scale configured in accordance with an embodiment of the present invention.

FIG. 7 shows another exemplary embodiment of a scale 101.1 according to the present invention, which corresponds to the preceding example, with the difference that it is fabricated in one piece by deforming a sheet of metal. Again, scale 101.1 includes the two outer side walls 103.1, 104.1, which are connected to each other by connecting web 105.1. Bridges 108.1 are integrally formed to side walls 103.1, 104.1 by bending by 90°, and first graduation elements 106.1 and second graduation elements 106.1 are formed to bridges 108.1 by once again bending by 90°. Optionally, a mounting element 109.1 is also integrally formed to the scale 101.1.

In all examples, it is particularly advantageous if graduation period P1 of graduation elements 6, 106, 106.1 of the first measuring graduation and graduation period P2 of graduation elements 7, 107, 107.1 of the second measuring graduation differ only slightly, so that an absolute position AP can be derived therefrom over several such graduation periods P1, P2. Thus, the absolute position measurement is based on the vernier principle.

Alternatively, the first measuring graduation of the scale for inductive position measurement may be a chain code. As is generally known, the chain code includes a sequence of bits, of which several successive bit in the measurement direction are scanned simultaneously, forming a code word that uniquely determines the absolute position and provides a coarse absolute position. In this case, the second measuring graduation may be a periodic incremental graduation that further divides the absolute position measured by the chain code through interpolation, providing a fine position. The evaluation unit combines the coarse absolute position of the chain code and the fine position of the incremental graduation into a resulting absolute position.

A plurality of scanning units spaced apart from one another in the measurement direction may be associated with scale 1, 101, 101.1 for purposes of position measurement. This may serve to provide redundant position measurement or to extend the measurement range. A plurality of spaced-apart scanning units may also serve to ensure continuous position measurement across a junction when scanning a plurality of successive abutting scales 1, 101, 101.1. In this process, a switchover from one scanning unit to another scanning unit may take place at the junction.

All exemplary embodiments have the advantage of providing a stable and torsionally exceptionally rigid scale 1, 101, 101.1 that enables reproducible absolute position measurement. The support channel member formed by the two side walls 3, 103, 103.1, 4, 104, 104.1 and connecting web 5, 105, 105.1 provides an outwardly smooth surface and mechanical protection of the comb-like graduation elements 6, 106, 106.1, 7, 107, 107.1. The support channel member enables optimal mechanical connection of graduation elements 6, 106, 106.1, 7, 107, 107.1, the connection being such that the eddy currents can form in graduation elements 6, 106, 106.1, 7, 107, 107.1 in an optimal manner. Furthermore, the support channel member has the function of providing electromagnetic shielding against interference from external fields.

The cavities between side wall 3, 103, 103.1, 4, 104, 104.1 and the respective opposite succession of graduation elements 6, 106, 106.1, 7, 107, 107.1 may optionally be filled with electrically non-conductive material, such as, for example, foam-like materials or plastic moldings, to protect against foreign objects.

The present invention enables an absolute position measurements that is immune to interference and requires a minimum of space. The construction is mechanically particularly stable and substantially immune to interference, even under the action of electromagnetic fields or alternating fields originating, for example, from a linear drive. Therefore, the inventive scale and position-measuring device can be attached directly to a linear drive. Thus, the inventive position-measuring device is suitable in particular for use in transport systems and in automation technology in conjunction with linear drives.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A scale for inductive position measurement along a measurement direction X, the scale comprising:
    a support channel made of electrically conductive material and having two interconnected spaced-apart side walls extending parallel to the measurement direction X and enclosing an interstitial space therebetween;
    a succession of first graduations made of electrically conductive material, the succession of first graduations being disposed on the support channel, located in the interstitial space opposite and spaced from one of the two side walls and extending parallel to the measurement direction X; and a succession of second graduations made of electrically conductive material, the succession of second graduations being disposed on the support channel, located in the interstitial space opposite and spaced from the other one of the two side walls and extending parallel to the measurement direction X, wherein the succession of first graduations and the succession of second graduations form a gap configured to receive a scanner operable to inductively scan the first graduations together with the second graduations.

2. The scale as recited in claim 1, wherein each of the first graduations and each of the second graduations are tongue-shaped elements which are spaced apart from one another in the measurement direction X.

3. The scale as recited in claim 1, wherein each of the graduations include a base and an end portion that is spaced apart from the base, wherein the first graduations are connected at the base to the second graduations, and wherein the graduations are each connected at the end portion to the respective opposite side wall.

4. The scale as recited in claim 1, wherein each of the graduations include a base and an end portion that is spaced apart from the base in a direction perpendicular to the measurement direction X, the graduations each being connected to the respective opposite side wall at the base and at the end portion.

5. The scale as recited in claim 4, wherein the graduations are each connected, at least at one of the base and the end portion, to the respective opposite side wall via a connection that has a constriction having a width which is a fraction of a width of the graduation to be connected.

6. The scale as recited in claim 5, wherein the connections of the graduations are provided at the end portions to the respective opposite side wall and are each configured as a bridge having the width in the measurement direction X which is the fraction of the width of the graduation to be connected.

7. The scale as recited in claim 6, wherein the bridge is disposed in a middle of the respective graduation.

8. The scale as recited in claim 1, wherein the scale is a self-supporting channel of electrically conductive material formed by deformation processing.

9. The scale as recited in claim 8, wherein the channel is manufactured from sheet metal by deformation processing.

10. The scale as recited in claim 8, wherein the scale is an extruded channel.

11. The scale as recited in claim 10, wherein the extruded channel is made of an aluminum material.

12. The scale as recited in claim 1, wherein the succession of first graduations and the succession of second graduations are configured for absolute position measurement over a path including a plurality of the first graduations.

13. The scale as recited in claim 12, wherein the scale is configured for the absolute position measurement using the vernier principle in that the succession of first graduations is a periodic incremental graduation having a first graduation period and the succession of second graduations is a periodic incremental graduation having a second graduation period that differs from the first graduation period.

14. A position-measuring device, comprising:

the scale according to claim 1; and the scanner which is disposed in the gap, the scanner having a first sensor configured to scan the first graduation elements and a second sensor configured to scan the second graduations, wherein the first sensor has an excitation winding configured to generate an alternating electromagnetic field and a scanning winding configured to detect the alternating electromagnetic field modulated as a function of position in the first graduations, and wherein the second sensor has an excitation winding configured to generate an alternating electromagnetic field and a scanning winding configured to detect the alternating electromagnetic field modulated as a function of position in the second graduations elements.

15. The position-measuring device as recited in claim 14, wherein at least one intermediate layer including a soft magnetic material is disposed between the scanning winding of the first sensor and the scanning winding of the second sensor.

16. The position-measuring device as recited in claim 15, wherein the at least one intermediate layer includes a soft magnetic core and electrically non-conductive soft magnetic layers disposed on both sides of the core.

17. The position-measuring device as recited in claim 16, wherein the core is composed of a soft magnetic, electrically conductive metal, and the layers each include an electrically non-conductive matrix material having soft magnetic particles embedded therein.

* * * * *